US012768448B1

(12) United States Patent
Pecak et al.

(10) Patent No.: US 12,768,448 B1
(45) Date of Patent: Oct. 20, 2026

(54) SEAL ASSEMBLY WITH A RETAINER HAVING LOCKING PROTRUSIONS

(71) Applicant: AKTIEBOLAGET SKF, Gothenburg (SE)

(72) Inventors: Robert D. Pecak, Naperville, IL (US); Daniel John Levy, Arlington Heights, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 19/214,652

(22) Filed: May 21, 2025

(51) Int. Cl.
*F16J 15/32* (2016.01)
*F16J 15/3204* (2016.01)

(52) U.S. Cl.
CPC ................................ *F16J 15/3204* (2013.01)

(58) Field of Classification Search
CPC .. F16J 15/3204; F16J 15/3248; F16J 15/3252; F16J 15/3256
See application file for complete search history.

(56) References Cited

U.S. PATENT DOCUMENTS 3,156,474 A * 11/1964 Nelson ................. F16J 15/3256 277/573
3,479,728 A * 11/1969 Micai ................... F16J 15/3256 29/523
5,201,528 A * 4/1993 Upper .................. F16J 15/3256 277/400
10,208,801 B1 * 2/2019 Wang .................. F16C 33/7886
11,761,541 B2 * 9/2023 Wilkins ............... F16J 15/3456 277/549
11,982,356 B2 * 5/2024 Wu ...................... F16J 15/3256
12,203,551 B1 * 1/2025 Beathard .............. F16J 15/3236
2011/0044569 A1 * 2/2011 Haepp .................. F16C 33/768 384/480

* cited by examiner

*Primary Examiner* — Christine M Mills
*Assistant Examiner* — L. Susmitha Koneru
(74) *Attorney, Agent, or Firm* — J-TEK LAW PLLC; Scott T. Wakeman; Mark A. Ussai

(57) ABSTRACT

A radial lip seal assembly includes an annular seal including annular case coupled with an outer member and an annular elastomeric seal member attached to the case and including a sealing lip. An annular sleeve includes a cylindrical portion disposed about a shaft and has an outer circumferential engagement surface engaged by the sealing lip, a radial flange extending from one axial end of the cylindrical portion and an annular pocket formed adjacent to the radial flange. An annular retainer is coupled with the sleeve and engageable with the seal case to prevent axial separation of the seal and the sleeve. The retainer has an inner radial end disposed within the annular pocket of the sleeve, an opposing outer radial end and at least one locking protrusion adjacent to the inner radial end. The protrusion(s) are engaged with the sleeve to prevent displacement of the retainer relative to the sleeve.

16 Claims, 6 Drawing Sheets

SEAL ASSEMBLY WITH A RETAINER HAVING LOCKING PROTRUSIONS

BACKGROUND OF THE INVENTION

The present invention relates to seals, and more particularly to radial lip seals used in the automotive industry.

Radial lip sealing assemblies are generally known and typically include an annular elastomeric sealing member attached to an annular metallic case, the sealing member including a primary radial seal lip. The case is either installed within a bore of an outer member (e.g., a wheel hub) so that radial seal lip engages radially inwardly against a shaft disposed within the bore or is mounted about the shaft with the seal lip engaging radially outwardly against the bore. Often, such sealing assemblies also include a sleeve that provides one or more circumferential surfaces engageable by the radial lip(s) of the sealing member and radial surface(s) engageable by axial lips of the sealing member or forming a labyrinth(s). Depending on the orientation of the sealing member, the sleeve is either disposed within the case or is disposed around the case such that the sealing assembly is provided as a single unit referred to as a "cassette".

A main benefit of a cassette seal is that the radially inner and outer members can be mounted and demounted together by axially displacing the entire cassette into the bore of the outer member and/or about the shaft. To ensure that the sleeve and case remain coupled together without damage to the sealing member, an annular retainer referred to in the sealing industry as a "third metal" is often coupled with the sleeve to provide a radial surface engageable by the case during installation and removal.

SUMMARY OF THE INVENTION

In one aspect, the present invention is a radial lip seal assembly for sealing between an outer member and a shaft disposed within the outer member. The seal assembly comprises an annular seal including annular case coupled with the outer member and an annular elastomeric seal member attached to the case and including a sealing lip. An annular sleeve includes a cylindrical portion disposed about the shaft and having an outer circumferential engagement surface, the sealing lip of the seal member being sealingly engaged with the engagement surface, a radial flange extending from one axial end of the cylindrical portion and an annular pocket formed adjacent to the radial flange. An annular retainer is coupled with the sleeve and engageable with the case of the seal to prevent axial separation of the seal and the sleeve. The retainer has an inner radial end disposed within the annular pocket of the sleeve, an opposing outer radial end and at least one protrusion adjacent to the inner radial end, engaged with the sleeve and configured to prevent displacement of the retainer relative to the sleeve.

Preferably, the at least one protrusion includes a plurality of protrusions spaced circumferentially apart and each engaged with the sleeve. The retainer has two opposing axial ends, the at least one protrusion extends axially from one of the two axial ends and the plurality of protrusions may extend from both axial ends. Each protrusion has a sharp outer point configured to embed within the sleeve, specifically during coupling of the retainer with the sleeve by bending an outer axial end of the sleeve to form the radial flange. Further, each protrusion is relatively narrow and has a circumferential width of three millimeters or less and is preferably formed during the fabrication of the retainer in a stamping operation.

Furthermore, the sleeve preferably has a reduced thickness section extending axially from a remainder of the sleeve and providing the radial flange and the annular pocket, and a transition section located between the reduced thickness section and the remainder of the sleeve. The one or more protrusions become engaged with the transition section or with the radial flange of the sleeve when the outer portion of the reduced thickness section is bent to form the radial flange. That is, the sharp outer point of each protrusion is forced into the material of the sleeve during bending of the reduced thickness section.

In another aspect, the present invention is also a method of forming a sleeve assembly for a seal assembly, the method comprising the steps of: providing a sleeve including an annular body with a cylindrical portion having opposing first and second axial ends, the cylindrical portion including a reduced thickness section extending inwardly from the first axial end to a transition section located between the first and second axial ends; providing an annular retainer having inner radial end defining a bore, an outer radial end and at least one integral protrusion adjacent to the inner radial end; axially displacing the retainer relative to the sleeve such that the reduced thickness section extends through the bore of the retainer and the retainer is disposed adjacent to the sleeve transition section; and bending the first axial end of the sleeve radially outwardly to form a radial flange and a pocket defined between the flange and the transition section of the sleeve, the inner radial end of the retainer being disposed within the pocket and the at least one protrusion engaging with the sleeve so as to prevent displacement of the retainer relative to the sleeve.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
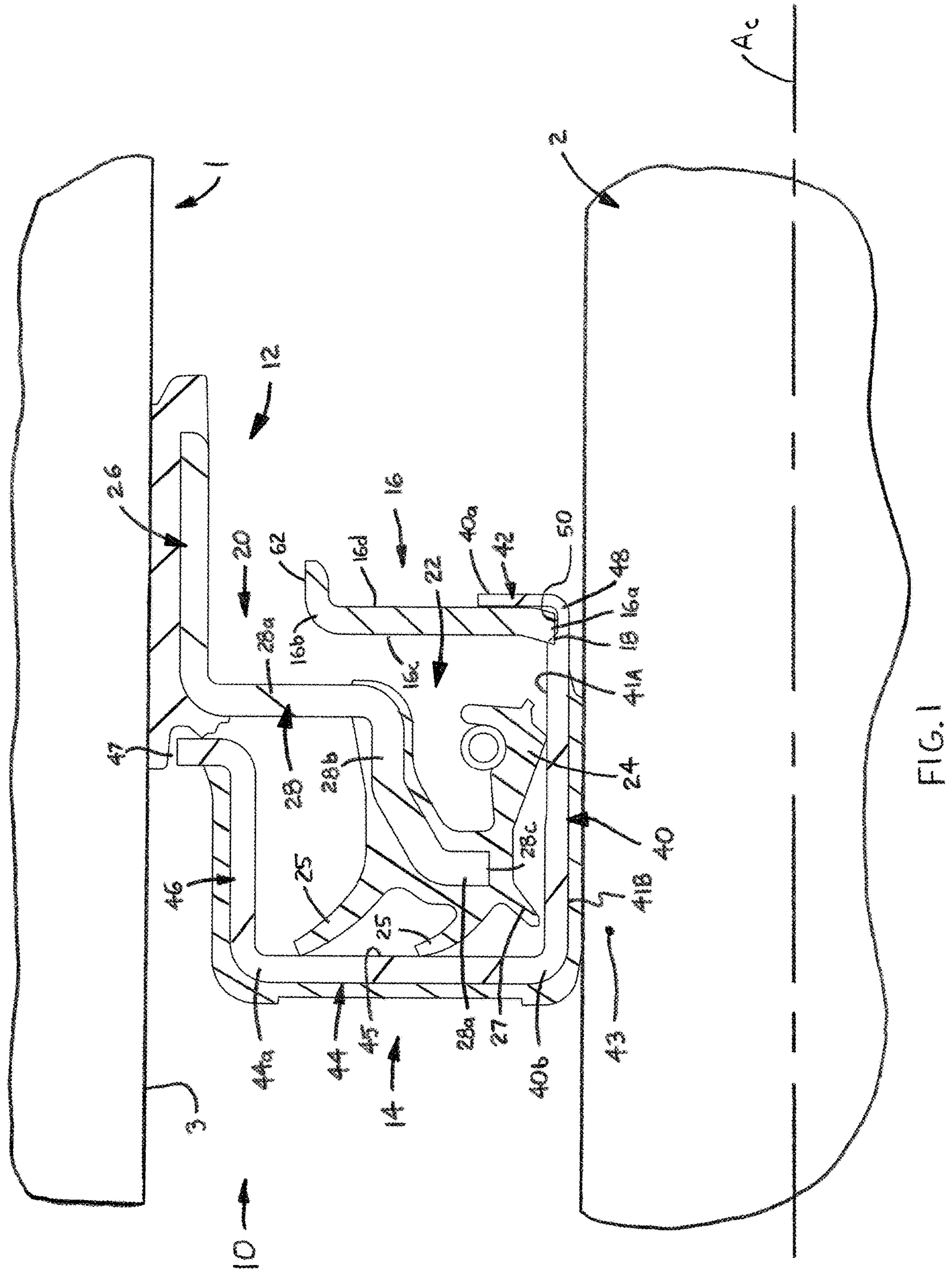
FIG. 1 is an axial cross-sectional view of an upper half of a seal assembly of the present invention, shown installed about a shaft and within a bore of an outer member.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a radial lip seal assembly 10 for sealing between an outer member 1, such as a hub or a housing, and a shaft 2 disposed within a bore 3 of the outer member 1. Either the outer member 1 or the shaft 2 is rotatable about a central axis $A_C$ (FIG. 1) extending through the shaft 2 and the outer member 1 and the shaft 2 are rotatably coupled by a bearing (not shown). Most preferably, the outer member 1 is a rotatable automotive wheel hub and the shaft 2 is a fixed spindle connected with a vehicle frame (not shown), but the seal assembly 10 may alternatively seal between a fixed outer member 1 and a rotatable inner member 2. In any case, the seal assembly 10 basically comprises an annular seal 12, an annular sleeve 14, and an annular retainer 16 coupled with the sleeve 14 and including at least one and preferably a plurality of "locking" protrusions 18 for securing the retainer 16 to the sleeve 14, as described in detail below.

Figure 3:
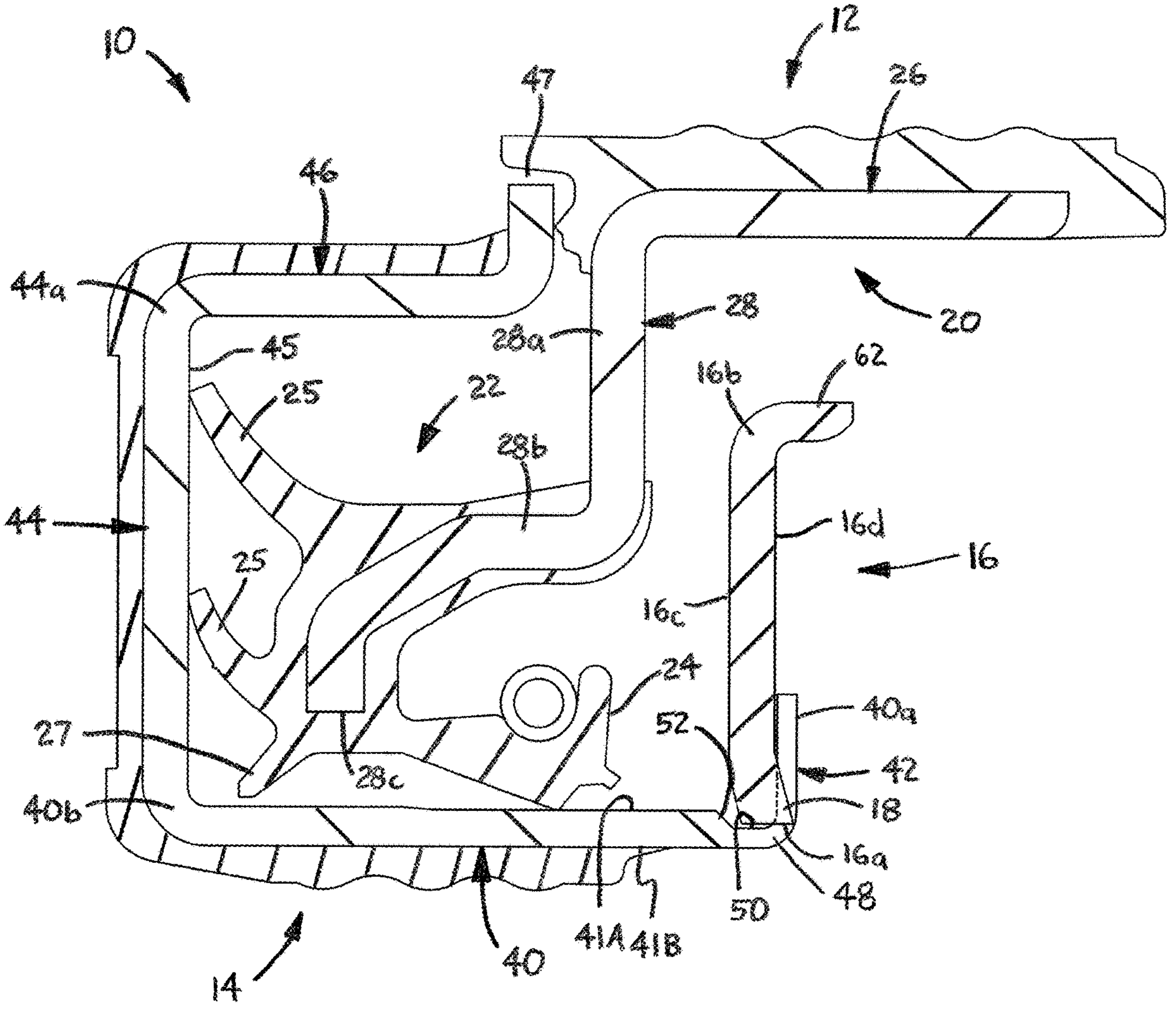
FIG. 3 another axial cross-sectional view of the upper half of the seal assembly, shown with a protrusion engaged with a radial flange of the sleeve.

Referring first to FIGS. 1 and 3, the annular seal 12 includes an annular case 20 coupled with the outer member 1 and an annular elastomeric seal member 22 attached to the case 20 and including a primary radial sealing lip 24. Preferably, the case 20 includes an axial section 26 configured to frictionally engage with the outer member 1 and a radial flange 28 extending inwardly from the axial section 26, which may include one or more radial sections 28*a* and/or axial sections 28*b* of any desired arrangement depending on the particular application. Further, the radial flange 28 of the case 20 is engageable with the retainer 16 to couple the sleeve 14 with the seal 12 during mounting and demounting of the seal assembly 10 from the shaft 2, such that the seal assembly 10 is installable and removable as a single unit or "cassette". Preferably, a section 28*a* of the radial flange 28 is spaced axially outwardly from an outer axial end (not indicated) of the sealing lip 24 to prevent contact between the lip 24 and the retainer 16 during mounting and demounting, but the retainer 16 may alternatively include a rim engageable with the case flange 28 to prevent such contact (structure not shown).

Further, the elastomeric seal member 22 is attached to the radial flange 28, preferably by bonding or molding, such that the primary radial sealing lip 24 extends axially from an inner radial end 28*c* of the radial flange 28. Preferably, the seal member 22 also includes one or more axial lips 25 engageable with the sleeve 14, as depicted, or spaced from the sleeve 14 to form a labyrinth (not shown), and may include one or more secondary radial lips 27 (one shown). Further, the seal 12 preferably includes an outer elastomeric section 30 disposed about an outer circumferential surface 26*a* of the case axial section 26, which may be a separate member (as shown) or be integrally formed with the elastomeric seal member 22 (not depicted).

Still referring to FIGS. 1 and 3, the annular sleeve 14 includes a main cylindrical portion 40 disposed about the shaft 2 and having opposing first and second axial ends 40*a*, 40*b*, a first radial flange 42 extending radially outwardly from the first axial end 40*a* and a second radial flange 44 extending radially outwardly from the second axial end 40*b*. The cylindrical portion 40 has an outer circumferential engagement surface 41A, the primary sealing lip 24 (and any secondary radial lips 27) of the elastomeric seal member 22 being sealingly engaged with the engagement surface 41A, and an opposing inner circumferential surface 41B defining a bore 43. The first radial flange 42 generally couples the retainer 16 to the sleeve 14, as described in detail below, and the second radial flange 44 provides one or more radial surfaces 45 which the seal axial lips 25 either sealingly engage, as shown, or define an axial labyrinth (not shown). Further, the sleeve 14 preferably further includes an outer axial flange 46 extending from an outer radial end 44*a* of the second radial flange 44, which both extends over and encloses the seal member 22 and defines an axial labyrinth 47 with the outer elastomeric section 26.

Figure 7:
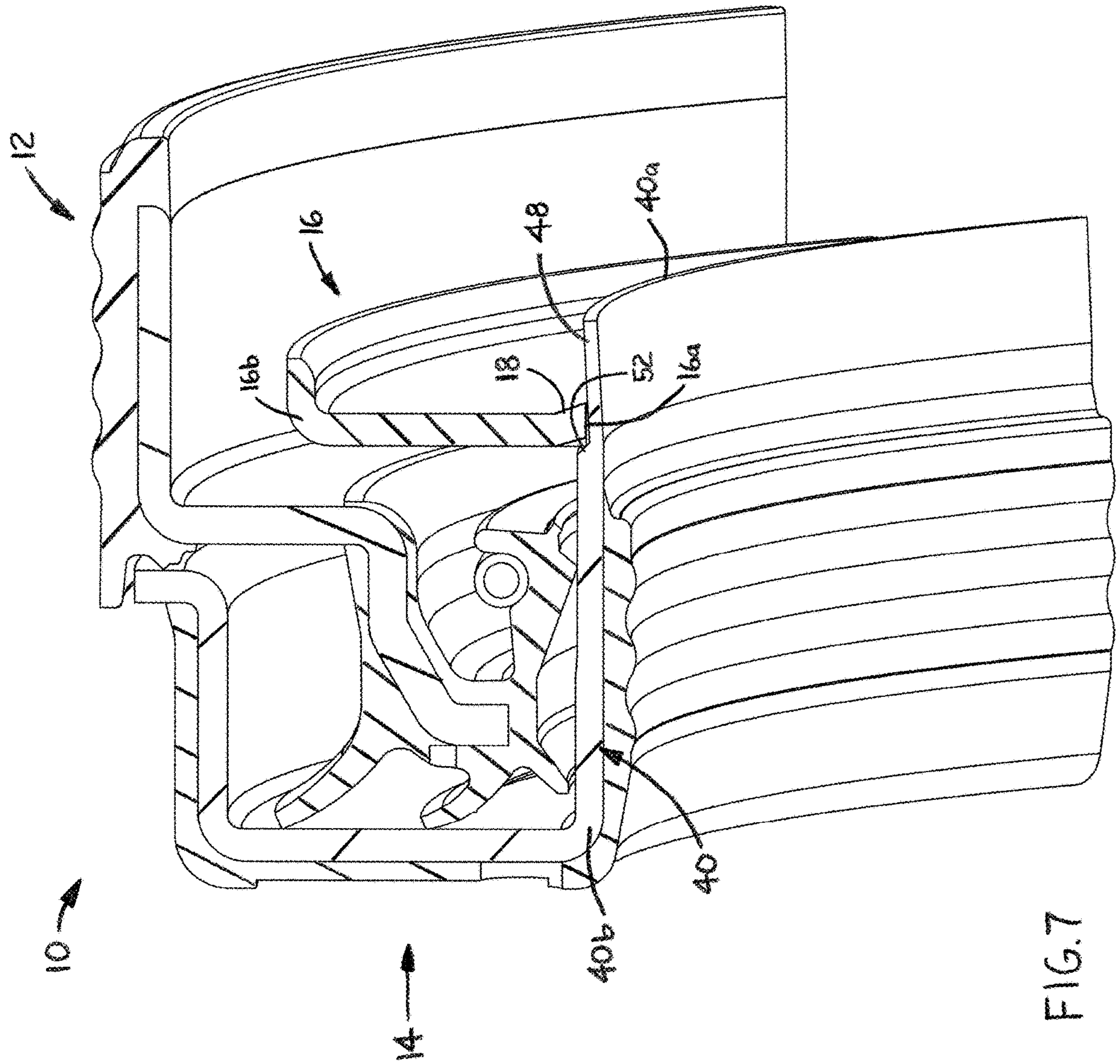
FIG. 7 is an axial cross-sectional view in partial perspective of the upper half of the seal assembly, shown with the retainer installed on the sleeve prior to bending of a reduced-thickness section of the sleeve.

Preferably, the cylindrical portion 40 of the sleeve 14 has a reduced thickness section 48 extending axially from a remainder of the cylindrical portion 40 and provides the first radial flange 42 and an annular pocket 50. A narrow transition section 52 is located axially between the reduced thickness section 48 and the remainder of the sleeve cylindrical portion 40. With this structure, the reduced thickness section 48 initially extends axially, as shown in FIG. 7, and is bent to both form the first radial flange 42 and the annular pocket 50 after installation of the retainer 16 on the sleeve 14, as described in detail below.

Figure 2:
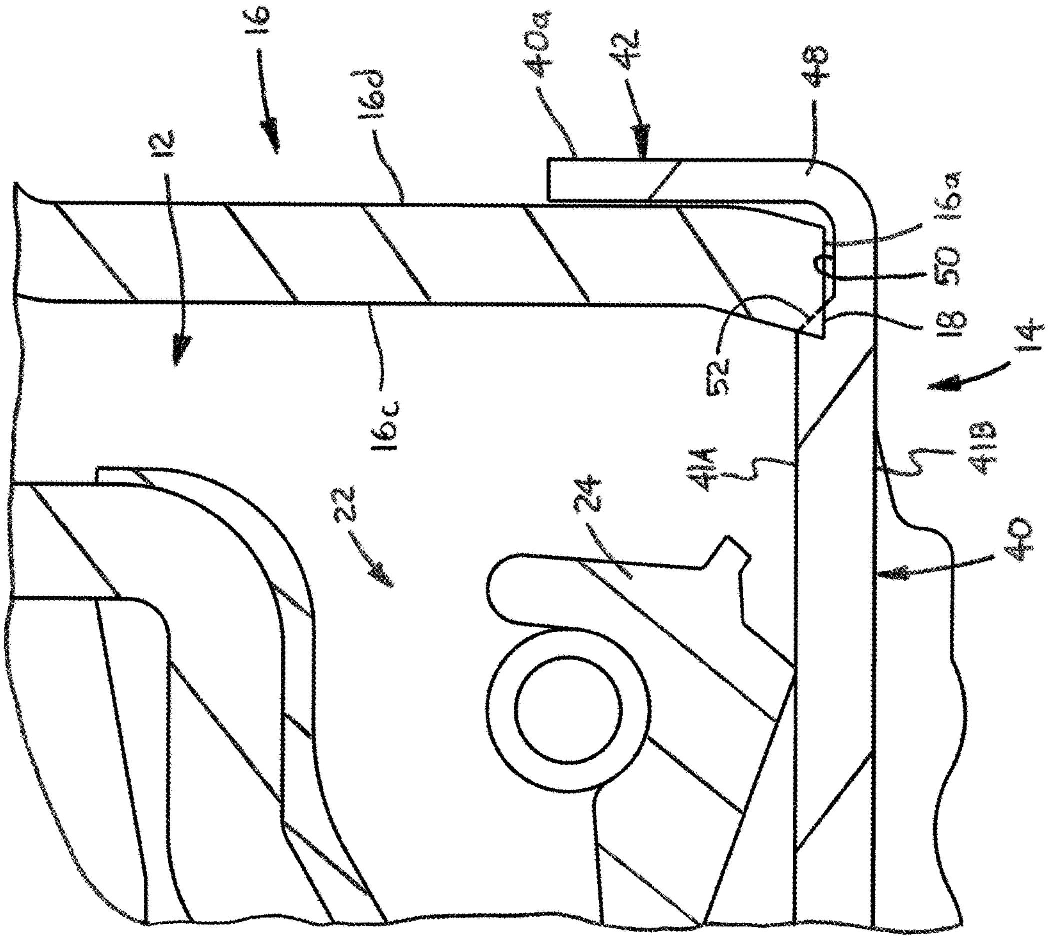
FIG. 2 is a broken-away, enlarged portion of FIG. 1, shown separate from the outer member and the shaft and depicting a "locking" protrusion engaged with a transition section of a sleeve.

Referring to FIGS. 1-3, the annular retainer 16 is coupled with the sleeve 14 and is engageable with the case 20 of the seal 12 to prevent axial separation of the seal 12 and the sleeve 14 during mounting and demounting of the seal assembly 10 within the outer member 1 and about the shaft 2. That is, the seal assembly 10 is typically mounted or demounted within the outer member 2 by pushing or pulling axially on the seal 12, such that the case 20 of the seal 12 engages with the retainer 16 and causes the sleeve 14 to displace axially with the seal 12. The retainer 16 has an inner radial end 16*a* disposed within the annular pocket 50 of the sleeve 14, an opposing outer radial end 16*b* and inner and outer axial ends 16*c*, 16*d*.

Figure 4:
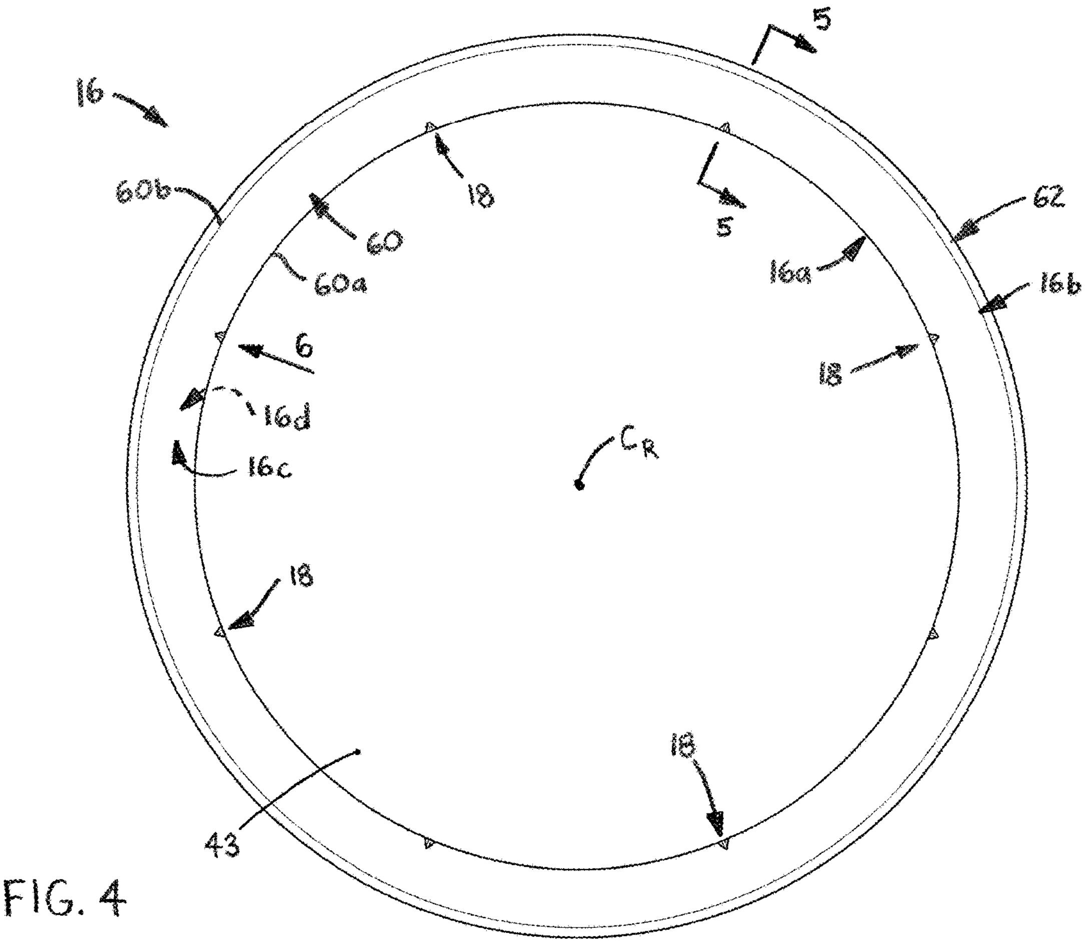
FIG. 4 is a top plan view of the retainer showing a plurality of the protrusions.
Figure 5:
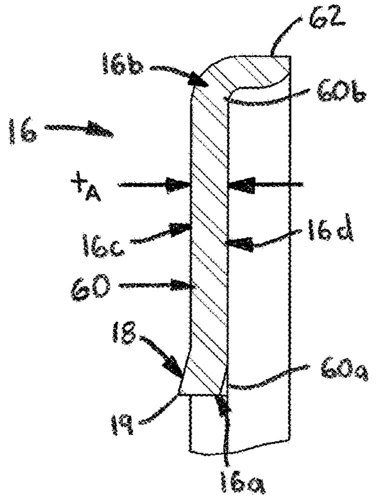
FIG. 5 is an enlarged view through line 5-5 of FIG. 4.

Referring to FIGS. 4 and 5, the retainer 16 is preferably formed as a generally straight wall including an annular plate 60 with an axial thickness ta (FIG. 5) extending uniformly between inner and outer radial ends 60*a*, 60*b*. Further, the retainer 16 preferably includes an annular rim 62 extending axially from the outer radial end 60*b* of the plate 60 so as to increase the rigidity of the retainer 16. In a presently preferred application, the rim 62 extends axially away from the case 20 of the seal 12 so that the case 20 is engageable with the inner axial end 16*c* of the retainer 16, but may alternatively extend toward the case 20 such that the case 20 is engageable with the rim 62 or have multiple sections extending in either axial direction (alternative structures not shown).

In general, the retainer 16 is coupled with the sleeve 14 when the first axial end 40*a* of the sleeve cylindrical portion 40 is bent to form the first radial flange 42 and the pocket 50, as the inner radial end 16*a* of the retainer 16 is preferably generally compressed between the flange 42 and the transition section 52 of the sleeve 14. However, due to tolerance variations during manufacturing of the seal assembly 10, the retainer 16 may not be sufficiently restrained by the radial flange 42 and transition section 52 and may thereby displace angularly and/or axially relative to the sleeve 14. As such, the retainer 16 of the present seal assembly 10 includes one or more locking protrusions 18 located adjacent to the inner radial end 16*a* and engaged with the sleeve 14. Each protrusion 18 is configured to prevent displacement of the retainer 16 relative to the sleeve 14, either axial displacement or angular displacement, so as to prevent "rattling" or other noise during handling of the seal assembly 10 or by vibrations during use.

Figure 8:
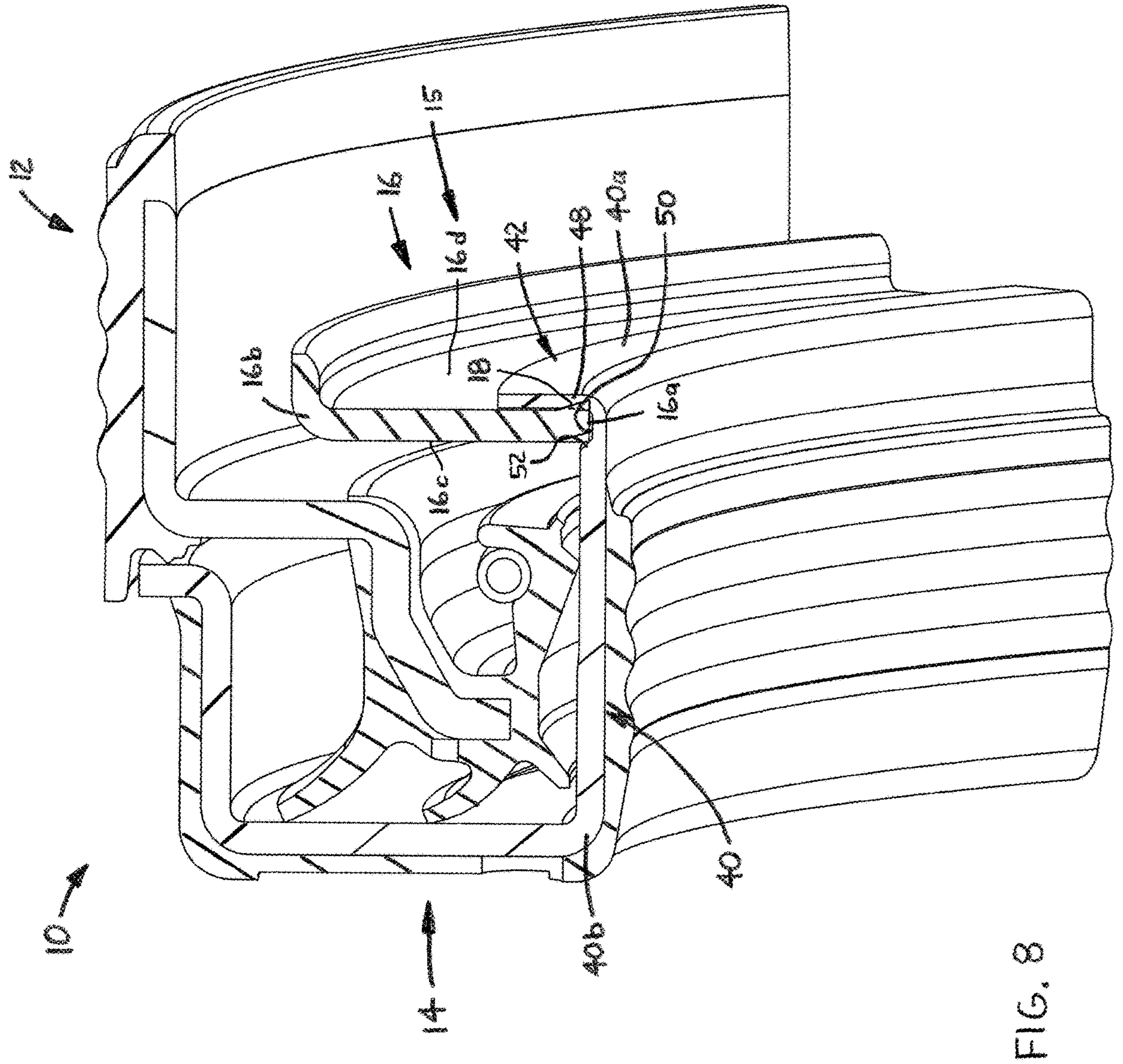
FIG. 8 is another axial cross-sectional view in partial perspective of the upper half of the seal assembly, shown after bending of the reduced-thickness section.

More specifically, each of the one or more protrusions 18 extends axially from one of the two axial ends 16*c*, 16*d* of the retainer 16 so as to engage either with the sleeve transition section 52 (FIGS. 1 and 2) or with the first radial flange 42 (FIGS. 3 and 8). Preferably, the retainer 16 includes a plurality of the protrusions 18 spaced circumferentially apart about a center CR (FIG. 4) of the retainer 16, either evenly or staggered, and each engaged with one of the portions 52 or 42 of the sleeve 14. For example, the retainer 16 may include a plurality of protrusions 18 extending axially from the retainer first axial end 16*c* and engaged with the transition section 52, a plurality of protrusions 18 extending axially from the second axial end 16*d* and engaged with the first radial flange 42, or a plurality of protrusions 18 extending from both axial ends 16*c*, 16*d* and engaged with both sections 52, 42.

Further, each protrusion 18 is relatively circumferentially narrow, preferably having a circumferential width $w_C$ (FIG. 6) of three millimeters (3 mm) or less, and has a sharp outer point 19. As such, each protrusion 18 is thereby configured to embed within the material of the sleeve 14. Specifically, as the sleeve first axial end 40*a* is bent to form the first radial flange 42, the retainer 16 is pressed between the flange 42 and the sleeve transition section 52, causing the protrusions 18 to pierce the sleeve 14 and become embedded therein. Thereby, the retainer 16 is fixedly attached to the sleeve 14 and thus incapable of displacing angularly or axially relative to the sleeve 14.

Further, each protrusion 18 is preferably integrally formed with the retainer 16, but may alternatively be a separate member attached to the retainer 16, such as for example, a sharp metallic prong (not shown) that is welded, brazed or otherwise attached to one axial end 16*c* or 16*d* of the retainer 16. Most preferably, each protrusion 18 is formed during the fabrication of the retainer 16 in a stamping operation. For example, the retainer 16 may be formed from a circular blank (not shown) by cutting out a circular piece (not shown) to form the central bore 43 with a circular punch and bending the outer flange with a circular forming die. Preferably, the one or more protrusions 18 are formed during the cutting of the circular piece to form the bore 43 by bending or coining one or more portions of the inner radial end 16*a* of the retainer 16 to form each protrusion 18, but may alternatively be formed in a separate step or stamping operation.

Figure 6:
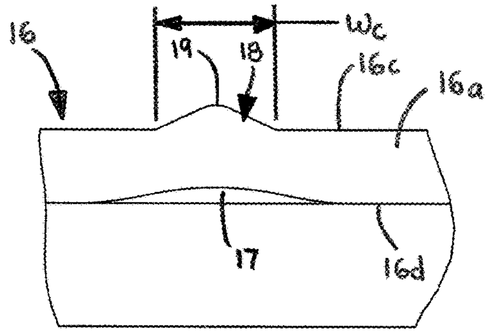
FIG. 6 is greatly enlarged, broken-away view of the retainer looking radially outwardly along arrow 6 of FIG. 4, showing an inner end of one protrusion.

When the protrusions 18 are formed in a stamping operation, the material providing the retainer 16 is deformed axially outwardly from one of the two axial ends 16*c*, 16*d* of the retainer 16, such that a concave cavity 17 may be formed in the other one of the retainer axial ends 16*d* or 16*c* as shown in FIG. 6. However, the retainer 16 and/or the protrusions 18 may be formed in any other appropriate manner, such as for example, by using an appropriate tool to form each protrusion 18.

Referring now to FIGS. 7 and 8, the retainer 16 is preferably coupled with the sleeve 14, so as to form a sleeve assembly 15, using the following method. First, a sleeve 14 is provided having a cylindrical portion 40 with opposing first and second axial ends 40*a*, 40*b* and a reduced thickness section 48 extending axially inwardly from the first axial end 40*a* to a transition section 52 located between the first and second axial ends 40*a*, 40*b*. At this point in the forming process, the entire reduced thickness section 48 extends axially so as to be cylindrical in shape, as shown in FIG. 7. Also, an annular retainer 16 is provided having an inner radial end 16*a* defining a bore 43 (as shown in FIG. 4), an outer radial end 16*b* and at least one integral protrusion 18 located adjacent to the inner radial end 16*a*. As discussed above, the retainer 16 and the one or more integral protrusions 18 are preferably formed in a stamping operation.

Then, the retainer 16 is axially displaced relative to the sleeve 14 such that the reduced thickness section 48 extends through the bore 43 of the retainer 16 until the retainer 16 is disposed adjacent to the sleeve transition section 52, as shown in FIG. 7. Finally, the first axial end 40*a* of the sleeve cylindrical portion 40 is bent radially outwardly to form the first radial flange 42 and define the pocket 50 between the flange 42 and the transition section 52 of the sleeve 14, the inner radial end 16*a* of the retainer 16 being disposed within the pocket 16 and the at least one protrusion 18 engaging with the sleeve 14, as depicted in FIG. 8.

As discussed in detail above, in the presently preferred arrangement of the seal assembly 10, the sleeve 14 is disposed about a fixed shaft/spindle 2 and the seal 12 is coupled with the bore 3 of the outer member 1 such that that the primary radial lip 24 seals inwardly against the sleeve 14, the retainer 16 extends radially outwardly from the sleeve 14 and the protrusion(s) 18 are located adjacent to the inner radial end 16*a* of the retainer 16. However, the scope of the present invention includes an arrangement in which the seal 12 is disposed about the shaft 2, i.e., the case 20 is mounted to the shaft 2 and the primary sealing lip 24 of the seal member 22 seals radially outwardly, the sleeve 14 is engaged with the bore 3 of the outer member 1, and the retainer 16 has an outer radial end 16*b* coupled with the sleeve 14 and extends radially inwardly, and the locking protrusions 18 are located adjacent to the retainer outer radial 16*b*. In this arrangement, either the shaft 2 is rotatable about the central axis $A_C$ and the outer member 1 is fixed or vice-versa. Further, the seal assembly 10 of the present invention may be used in an arrangement depicted in FIGS. 1, 3 and 8, but with the outer member 1 being fixed and the shaft 2 being rotatable.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A radial lip seal assembly for sealing between an outer member and a shaft disposed within the outer member, the seal assembly comprising:

an annular seal including annular case coupled with the outer member and an annular elastomeric seal member attached to the case and including a sealing lip;

an annular sleeve including a cylindrical portion disposed about the shaft and having an outer circumferential engagement surface, the sealing lip of the seal member being sealingly engaged with the engagement surface, and a radial flange extending from one axial end of the cylindrical portion and an annular pocket formed adjacent to the radial flange; and an annular retainer coupled with the sleeve and engageable with the case of the seal to prevent axial separation of the seal and the sleeve, the retainer having an inner radial end disposed within the annular pocket of the sleeve, an opposing outer radial end and at least one protrusion located adjacent to the inner radial end, embedded within the material of the sleeve and configured to prevent displacement of the retainer relative to the sleeve.

2. The seal assembly as recited in claim 1, wherein the at least one protrusion includes a plurality of protrusions spaced circumferentially apart and each engaged with the sleeve.

3. The seal assembly as recited in claim 1, wherein the retainer has two opposing axial ends and the at least one protrusion extends axially from one of the two axial ends.

4. The seal assembly as recited in claim 1, wherein the at least one protrusion has a sharp outer point configured to embed within the sleeve.

5. The seal assembly as recited in claim 1, wherein the at least one protrusion has a circumferential width of three millimeters or less.

6. The seal assembly as recited in claim 1, wherein the sleeve has a reduced thickness section, the reduced thickness section extending axially from a remainder of the sleeve and providing the radial flange and the annular pocket, and a transition section located between the reduced thickness section and the remainder of the sleeve, the at least one protrusion being engaged with the transition section of the sleeve.

7. The seal assembly as recited in claim 1, wherein the at least one protrusion is engaged with the radial flange of the sleeve.

8. The seal assembly as recited in claim 1, wherein the retainer includes an annular plate with an axial thickness extending uniformly between the inner and outer radial ends.

9. The seal assembly as recited in claim 8, wherein the retainer further includes an annular rim extending axially from the outer radial end of the plate.

10. The seal assembly as recited in claim 1, wherein the at least one protrusion is formed during the fabrication of the retainer in a stamping operation.

11. The seal assembly as recited in claim 1, wherein the cylindrical portion of the sleeve has opposing axial ends and the sleeve further includes a second radial flange extending radially outwardly from the second axial end.

12. The seal assembly as recited in claim 1, wherein the case of the seal includes an axial flange engaged with the outer member and a radial flange extending inwardly from the axial flange, the seal member being attached to the radial flange such that the sealing lip extends axially from the radial flange, the radial flange being engageable with the retainer to couple the sleeve with the seal member during mounting and demounting of the seal assembly from the shaft.

13. A method of forming a sleeve assembly for a seal assembly, the method comprising the steps of:

providing a sleeve including an annular body with a cylindrical portion having opposing first and second axial ends, the cylindrical portion including a reduced thickness section extending inwardly from the first axial end to a transition section located between the first and second axial ends;

providing an annular retainer having inner radial end defining a bore, an outer radial end and at least one integral protrusion adjacent to the inner radial end;

axially displacing the retainer relative to the sleeve such that the reduced thickness section extends through the bore of the retainer and the retainer is disposed adjacent to the sleeve transition section; and bending the first axial end of the sleeve radially outwardly to form a radial flange and an annular pocket defined between the flange and the transition section of the sleeve, the inner radial end of the retainer being disposed within the pocket and the at least one protrusion embedding within the material of the sleeve so as to prevent displacement of the retainer relative to the sleeve.

14. The method as recited in claim 13, wherein the at least one protrusion has a sharp outer point configured to embed within the sleeve during the step of bending the first axial end of the sleeve.

15. The method as recited in claim 13, wherein the step of providing the annular retainer includes forming the retainer and the at least one integral protrusion in a stamping operation.

16. A radial lip seal assembly for sealing between an outer member and a shaft disposed within the outer member, the seal assembly comprising:

an annular seal including an annular case coupled with one of the outer member and the shaft and an annular elastomeric seal member attached to the case and including a sealing lip;

an annular sleeve including a cylindrical portion coupled with the other one of the outer member and the shaft and having a circumferential engagement surface, the sealing lip of the seal member being sealingly engaged with the engagement surface, a radial flange extending from one axial end of the cylindrical portion and an annular pocket formed adjacent to the radial flange; and an annular retainer coupled with the sleeve and engageable with the case of the seal to prevent axial separation of the seal and the sleeve, the retainer having an inner radial end, an outer radial end, one of the inner and outer radial ends being disposed within the annular pocket of the sleeve, and at least one protrusion adjacent to the one radial end and embedded within the material of the sleeve so as to prevent displacement of the retainer relative to the sleeve.

* * * * *